United States Patent [19]

Feins

[11] 3,853,791

[45] Dec. 10, 1974

[54] OXIDE AND MOLYBDENUM OXIDE ON AN ALUMINA SUPPORT AND CATALYST OBTAINED

[75] Inventor: Irvin Ralph Feins, Westport, Conn.

[73] Assignee: American Cyanamid Company, Stamford, Conn.

[22] Filed: Feb. 6, 1973

[21] Appl. No.: 330,169

[52] U.S. Cl............... 252/465, 208/216, 252/466 J
[51] Int. Cl............................................. B01j 11/22
[58] Field of Search..................... 252/465; 208/216

[56] References Cited
UNITED STATES PATENTS

| | | | |
|---|---|---|---|
| 2,393,288 | 1/1946 | Byrns............................ | 252/465 X |
| 2,913,422 | 11/1959 | Reitmeier..................... | 252/465 |
| 2,980,632 | 4/1961 | Malley et al.................. | 252/465 |
| 2,983,691 | 5/1961 | Richardson................... | 252/465 X |
| 3,232,887 | 2/1966 | Pessimisis..................... | 252/435 |
| 3,267,025 | 8/1966 | Gring et al.................... | 208/216 X |
| 3,403,111 | 9/1968 | Colgan et al.................. | 252/465 |
| 3,471,399 | 10/1969 | O'Hara........................... | 208/216 |
| 3,751,380 | 8/1973 | O'Hara........................... | 252/439 |

FOREIGN PATENTS OR APPLICATIONS 1,220,105    1/1971    Great Britain..................... 252/465

Primary Examiner—Daniel E. Wyman
Assistant Examiner—W. J. Shine
Attorney, Agent, or Firm—William J. van Loo

[57]    ABSTRACT

A process for an improved hydrodesulfurization catalyst comprising treating a calcined formed alumina support with a stabilized solution of a cobalt source, a molybdenum source and urea and then drying and activating the treated support to provide a composite of improved activity.

10 Claims, No Drawings

OXIDE AND MOLYBDENUM OXIDE ON AN ALUMINA SUPPORT AND CATALYST OBTAINED

CROSS-REFERENCES TO RELATED APPLICATIONS

This application is related to application Ser. No. 330,166, Ser. No. 330,167, and Ser. No. 330,168 filed on even date herewith.

This invention relates to a process for preparing an improved hydrodesulfurization catalyst. More particularly, this invention relates to a process wherein a calcined, formed alumina support is treated with a stabilized solution containing a cobalt source, a molybdenum source, and urea and is then dried and activated to provide a highly active hydrodesulfurization catalyst composite.

In recent years, an increasing awareness of environmental pollution has become manifest, particularly with respect to air pollution. This awareness has, in turn, led to the recognition of pollution sources. A chief source of air pollution is the exhaust vapor emanating from internal combustion engines, i.e., automobiles. Much effort has been expended to control this pollutant, including legislation requiring reduced pollutant levels in exhaust vapor emanating from new cars. Although air pollution caused by cars has received considerable attention, air pollution by emissions from other sources has not been overlooked.

Signficant contributors to air pollution are emissions which arise in the combustion of heating oils used in furnaces. Such emissions contain oxides of sulfur which are toxic and reactive. Sulfur arises in these oils as a result of its presence in the crude oil source. The increasing shortages of energy supplies have created an acute shortage of heating oils. To relieve this shortage, resort has been to inferior sources of heating oils which have increased sulfur contents. Such resort can give rise to increased pollution problems unless catalytic treatment of the heating oil sources can reduce the sulfur content effectively. Recently, legislation has been enacted to limit the content of sulfur in heating oils to 0.3 percent. In a recent critical shortage of heating oils, a major supplier requested that the limit as to sulfur content be raised to 2.8 percent so as to relieve the shortage. Since the sulfur present in the heating oils is that which remains after catalytic treatment of the feed stocks from which heating oils are derived, a critical need for more active catalyst for treatment of feed stocks is apparent.

The feed stocks from which heating oils are derived are light catalytic cycle oils and light virgin gas oils which are generally used in admixture. The terms used to describe the feed stocks refer more specifically to the maner by which they arise and indicate their boiling range. Typically, the blend of feed stocks has a boiling range of about 24°–730°F., a gravity of about 28–32 in accordance with the method of reporting specificied by the American Petroleum Industry, a basic nitrogen content of about 30–50 parts per million, and a sulfur content of about 1.3–1.5 weight percent. However, the current trend to secondary feed stocks has apparently resulted in a considerable increase in sulfur content. Because of the high sulfur content of the feed stock blend and the adverse levels of pollutants generated by combustion thereof, it is subjected to catalytic hydrotreatment, which reduces sulfur content, as well as basic nitrogen content so as to qualify the blend as an acceptable heating oil. The actual extent to which sulfur removal is effected will depend upon many factors, primarily the original sulfur content of the feed stock, the temperature at which treatment is effected, and the activity value of the catalyst employed in the hydrodesulfurization reaction. Although sulfur removal in the past was at the discretion of those converting feed stocks to heating oils, the recent legislation requires a high level of removal which is becoming increasingly difficult to achieve. Although easing of this requirement is sought by suppliers of heating oils, the increasing presence of air pollutants in the atmosphere would indicate a contrary trend.

The most widely used catalysts in the hydrodesulfurization reaction as it applies to heating oils are composites comprising cobalt oxide, molybdenum oxide and alumina, wherein alumina is the support carrying the other agents as promoters. Typically, such catalysts are effective in removing from about 70 percent to 90 percent of the sulfur present in primary feed stocks. However, such removal can still leave sulfur levels above current limitations, especially when secondary feed stocks are considered. Although the more active of current catalyst materials can provide the required sulfur removal in primary feed stocks, the temperature required for effecting such removal is higher than is desirable. In addition, to achieve the necessary sulfur removal, peak activity must be maintained over extended operating times and catalyst activity declines upon continued use, especially at high operating temperatures. The ever-decreasing availability of raw material sources and the ever-increasing shortage of heating oils have combined to make reliance upon secondary feed stocks essential and thus have complicated the problems of sulfur removal.

A number of conventional methods have been employed to prepare the catalyst composites useful in hydrotreating. A preferred procedure is to prepare a formed alumina support and thereafter impregnate the support with the desired levels of promoter sources. Upon activation of the impregnated support, the catalyst composite is obtained. The particular procedures followed and specific materials employed, however, can greatly influence catalytic activity of the composite obtained.

An alternative procedure is disclosed in British Pat. Specification No. 1,220,105, published Jan. 21, 1971 in the name of Stamicarbon, N.V. The process disclosed prepares a supported metal-containing catalyst by precipitating on a support the catalytically active material. The catalylic metal in the form of a soluble compound is prepared as a solution, said compound forming a precipitate on reaction with a hydroxyl ion. The support is added to the promoter solution to form a suspension. Hydroxyl ions by in situ generation are made available at a slow rate and under controlled agitation so that the precipitate is formed on the support and not in the body of the solution. Urea may be used as a source of hydroxyl ions by hydrolysis thereof.

In German Pat. No. 740,634, issued Oct. 25, 1943 to F. Stowenert, there is disclosed a process for preparing a catalyst by heating a solution of certain metal compounds that are precipitated in the presence of urea, the heating being carried out in the presence of a carrier to form an insoluble compound in or on said support.

In U.S. Pat. No. 3,637,529, issued Jan. 25, 1972 to Van Beek et al., there is disclosed a process for preparing a metallic catalytic agent by impregnating a carrier with an aqueous solution of a salt of the metallic catalytic agent and a source, upon heating in aqueous solution, of hydroxyl ions. The impregnated catalyst is then heated without substantial loss of water to precipitate the metallic catalytic agent on the carrier by the action of the hydroxyl ions generated by such heating. Urea may be used as the source of hydroxyl ions by hydrolysis thereof upon heating.

The processes of the cited patents required complicated precipitation steps that are tedious to preform and difficult to control, have special requirements as to useful materials, and lead to destruction or loss of considerable product.

Thus, there continues to exist the need for improved processes for preparing catalyst composites that avoid the aforementioned deficiencies and provide hydrocracking catalysts of greatly improved activity in hydrosulfurization.

It would also be highly desirable if a new process which can provide greatly improved catalytic activity could also reduce pollutant emissions normally associated with catalyst preparations. Pollutant emissions arise from the nitric acid and nitrate salts used in catalyst preparations. These materials are present on the catalyst in the form in which it is activated. Upon activation of the catalyst copious emissions of oxides of nitrogen arise and can give forth air pollution. To minimize air pollution possibilities, it is necessary to install and maintain costly and bulky scrubbers for treatment of the emission arising from catalyst activation.

In accordance with the present invention, there is provided a process for preparing a hydrodesulfurization catalyst which comprises: preparing a calcined formed alumina support; treating said support so as to furnish thereon (a) a cobalt source, (b) a molybdenum source, and (c) urea in an amount at least 0.5 molar with respect to the molar quantity of cobalt furnished, said furnish providing an aqueous solution stable with respect to precipitation; dehydrating the thus treated support; and activating the dehydrated support so as to provide a composite containing from about 1 percent to 8 percent cobalt and from about 8 percent to 20 percent molybdenum, said percentages being by weight based on the weight of the activated composite and expressed as the metal oxides.

The present invention provides a simplified process for preparing an improved hydrodesulfurization catalyst and offers many advantages. When sources of oxides of nitrogen are present in the catalyst being activated, the present process, by providing urea in the composite being activated, converts such oxides to innocuous emissions. Furnish requirements as to promoter sources are met within the range used in pore saturation techniques, thus minimizing solution volumes and mechanical handling of the support. The use of urea in conjunction with the promoter sources aids in stabilization with respect to precipitation of promoter sources. Such action by urea enables requirements for acid, if necessary as a solvent and/or solution stabilizer, to be reduced, thus minimizing or eliminating adverse effects on catalyst properties that can arise from acid residues persisting after activation. The catalyst composites obtained by the present process are uniformly colored in a royal blue shade and their appearance is strong evidence of a high degree of uniformity in promoter distribution. The combination of promoter sources and urea as employed in the present invention provides activated composites which exhibit sulfur removal activities that are greatly superior to those of prior art composites, exhibiting a 72-fold increase thereover in a preferred embodiment. Nitrogen removal activities are also greatly superior to those of prior art composites, exhibiting a 55-fold increase in a preferred embodiment.

Certain of the results obtained by the present process are highly surprising and quite unexpected. Although urea was known to suppress oxides of nitrogen in unrelated areas, the facts that urea should provide benefits in catalsyt activity as well as aid in solution of promoter sources are highly surprising. The results as to catalytic activity are all the more surprising in view of the fact that no material changes in surface area and porosity from those of conventional catalysts are occasioned by use of urea in the present process. It is also surprising that urea provides greatly increased activity with cobalt-molybdenum promoter combinations in the present process and fails to provide any increased activity with nickel-molybdenum combinations under identical processing.

The present inventor is unaware of the exact mechanism by which urea effects the improved catalyst activity in the present process and does not wish to be bound by any theory. However, the inventor is of the opinion that urea, upon dehydration of the treated support, crystallizes upon the support and controls the manner in which the promoter sources form on the support. Urea is a well-known inclusion compound, hosting many guest compounds within its crystal structure. The reduced acid requirements occasioned by urea when such acid is normally required to solubilize and stabilize a solution of promoters also suggests a solubilizing role for urea, especially during later stages of dehydration of the treated composite. The uniform nature of the rich coloration of the activated composites is evidence of a highly uniform and intimate promoter distribution. Although it is not possible to determine the exact nature of the distinctive royal blue coloration, such coloration nevertheless is a feature of catalysts provided by the process of the present invention.

In the present discussion, a carrier is a porous substrate or base upon which promoter materials are carried. Such substrates may be inactive or of limited activity in the catalytic reaction involved and the addition of promoter materials thereto imparts activity or improves activity with respect to the reaction. Promoter materials are substances which can be impregnated on the carrier and upon subsequent activation of the impregnated carrier will provide the active forms of the promoters, generally metals or metal oxides. A catalyst or catalyst materials or composite consists of the carrier and the content of promoters.

Hydrotreating is a term used to denote that reduction in the presence of hydrogen is the catalytic process involved. Hydrodesulfurization is a term used to denote that sulfur is removed in a catalytic reaction with hydrogen. When sulfur removal is carried out on feed stocks for heating oils, it is effected by hydrodesulfurization. However, such feed stocks generally also contain nitrogen and it is generally removed coincidental to the sulfur removal. Thus, when both sulfur and nitrogen are removed the process is properly termed hydrotreating. When only sulfur is removed, the process is properly called hydrodesulfurization. In the present discussion, emphasis is placed on hydrodesulfurization since that is the primary concern.

In carrying out the process of the present invention, a preformed calcined alumina support is first prepared. The alumina suitable for use in preparing the formed support is conventionally prepared by precipitation from a water solution of a water-soluble aluminum compound which may be either an aluminum salt such as aluminum sulfate, aluminum nitrate, aluminum chloride or the like, or an alkali metal aluminate such as sodium or potassium aluminate. Typically, such alumina may be prepared in accordance with the description appearing in U.S. Pat. No. 2,980,632, issued Apr. 18, 1961 to Malley et al. According to the procedure set forth therein, an alumina percipitate is filtered and washed to reduce alkali metal and salt anions such as sulfate to acceptable levels, i.e., below 0.02 percent for alkali metal and 0.5 percent for sulfate or the like, and are thereafter spray dried. As in the case of the alumina described therein, it is preferred that the dried alumina contemplated for use in the present process be characterized by a surface area when calcined of at least 150 square meters per gram, a pore volume of at least 0.5 cc. per gram (usually from 0.5 to about 1.0) and an apparent bulk density (ABD) within the range of about 0.2 to about 0.6 gram per cc. prior to forming, as by extrusion, and impregnation.

The dried alumina, obtained as indicated above, is processed into formed supports, such as by extrusion. A typical extrusion procedure comprises preparing a slurry of the dried alumina, mix-mulling the slurry to an extrudable consistency, extruding the mix-mulled slurry and thereafter drying and calcining the extrudates which are generally cut to the length desired as extruded.

Typically, formed unpromoted carrier particles such as extrudates are characterized, after calcination, by a surface area of from about 200 to about 300 square meters per gram, a pore volume of about 0.5 to 0.9 cc. per gram, and an ABD of from about 0.5 to 0.8 gram per cc. Also, a final catalyst, i.e. a catalyst after treatment and activation of the treated support will have a surface area of from 150 to 275 square meters per gram, a pore volume of from about 0.4 to 0.8 cc. per gram, and an ABD of from about 0.5 to 0.9 gram per cc.

By "calcined formed alumina support," as that and similar expressions are used herein, is meant a support in one of a number of particulate forms in which form the alumina is calcined. Preferably, such support is pelletized as by extruding or compression molding and is typically prepared as a pellet of 1/8 or 1/16 inch diameter. The alumina forming the support may be calcined prior to pelleting or may be calcined subsequent thereto, the important aspect being that the alumina be both formed and calcined prior to promoter treatment.

By "alumina support," as that and similar expressions are employed herein, is meant substantially pure alumina or alumina containing minor amounts, for example up to about 10 weight percent, of such known stabilizers as silica. Stabilizers such as silica may be incorporated into the alumina by addition of synthetic silica-alumina hydrogel cracking catalyst precursor in hydrogel form to precipitated alumina.

After the calcined formed alumina has been prepared as indicated above, it is next treated so as to furnish thereon a cobalt source, a molybdenum source and urea, so that the furnish results in an aqueous solution stable against precipitation. It is possible to prepare separate solutions of the materials to be furnished and add appropriate amounts thereof. It is also possible to combine two or more of the materials in a single solution as the furnish. It is generally preferred to make a single aqueous solution of all the materials to be furnished since better control over the solution can be maintained. A further alternative is that of separately applying an ingredient, such as an aqueous solution of urea, to the base, at least partially removing water from the thus treated base and then subsequently furnishing the additional materials in the form of an aqueous solution whereupon the urea is redissolved by the treating solution. It is generally preferred to furnish the materials required as aqueous solutions by spraying the support therewith, preferably by spraying a single solution of all required ingredients.

In preparing treating solutions for use in the present process, water-soluble promoter sources are necessary. It is also necessary to consider the compatibility of the sources with one another in solution since solutions stable against precipitation are required. Certain combinations of promoters may require use of a solubilizing or stabilizing acid therewith. Other combinations, which generally provide acidic solutions, do not require acid addition. The presence of urea in the eventual combination solution used to treat the support aids in solubilizing and stabilizing the solution. For this reason it is preferred to use the combined solution as the sole furnish since reduced acid requirements, when necessary, will ensue. It can be appreciated, however, that regardless of how the furnish is made, the furnish ultimately treating the support will be a composite solution containing all ingredients and stable against precipitation.

Urea, of course, is highly soluble in water, forming a 50 weight percent solution at 17°C. and being infinitely soluble in hot water.

Two promoter materials only are useful in the present process, cobalt and molybdenum in the form of their oxides. Accordingly, soluble sources of these promoters are employed. Cobalt nitrate is preferably used because of its high water-solubility. The provision of the present invention for rendering non-polluting oxides of nitrogen enables such use to be made without the difficulties previously discussed. Other soluble salts of cobalt may be used, such as cobalt acetate. The amount of cobalt to be furnished is such as to provide from about 1 percent to 8 percent by weight, based on the weight of the activated composite and expressed as its oxide.

Suitable soluble molybdenum sources include ammonium molybdates such as ammonium dimolybdate, ammonium heptamolybdate, and the like, molybdic trioxide, and others. The amount of molybdenum to be furnished is such as to provide from about 8 percent to 20 percent, be weight, based on the weight of the calcined composite and expressed as its oxide.

Urea is used in an amount which provides at least 0.5 mole of urea per mole of cobalt furnished. The upper limit of urea usage is only dictated by practical considerations and at usages above about 2.5 mole per mole of cobalt present, no advantage arises from higher usage. It is generally preferred to use at least 1 mole of urea per mole of cobalt furnished, more preferably 2 moles of urea per mole of cobalt furnished.

After the support has been treated as described, dehydration of the support is next effected. No particular urgency is associated with dehydration and it may be deferred until convenient. Dehydration does not have to be carried out as a separate step but may be accomplished during composite warm-up in conjunction with the activation step. Whenever dehydration is contemplated as a separate step, however, it may be carried out at a temperature in the range of about 200°–500°F. for a time period suitable for the required water removal. Lower temperatures, i.e., down to ambient, may be used if no particular urgency for drying exists. Similar dehydrating conditions are pertinent when dehydration between separate solution treatments in the instance mentioned is contemplated.

After treatment and any separate provision for dehydration contemplated are complete, the resultant support with its content of promoter sources and urea, is subjected to activation, which consists of heat treatment. Heat treatment is generally referred to as calcination and consists of exposing the treated support to an elevated temperature for a specified time period, the combination temperature and time being adequate to convert the metal sources to the corresponding oxides. Generally, temperatures in the range of about 800° to 1,300°F. are employed for time periods necessary to complete conversion. The calcination is carried out in a manner such that the catalyst material remains at the specified temperature for an hour or more, the time required to reach the temperature being additional. The specific heating schedule by which the catalyst material reaches the final temperature may vary widely and may be influenced by the particular equipment employed. The activation may be by means of a calciner, muffle furnace, rotary kiln, and similar devices which enable the desired temperature to be reached. In preferred instances, it is desirable to carry out the heating schedule in a staged manner, i.e., taking a specified time to reach a selected first intermediate temperature, again taking a specified time from the first intermediate temperature to reach a second intermediate temperature and so on until the final temperature is reached and held for a specified time. A particularly effective heating schedule is one following dehydration at about 220°F. for about 4 hours. The dehydrated treated support is placed in a calciner already heated to a temperature of about 390°F. The temperature of the calciner is then gradually raised over a 17 hour period to about 660°F. At the end of this time, the temperature of the calciner is rapidly raised to 1200°F. and the catalyst material is activated at this temperature for 1.5 hours.

After activation is complete, there is obtained a deep royal blue catalyst composite highly active in sulfur and basic nitrogen removal when used in processing feed stocks for heating oils.

The invention is more fully illustrated by the examples which follow wherein all parts and percentages are by weight unless otherwise specifically designated.

In order to provide a basis for comparison of activity of the catalysts of the present invention with those of the prior art, a typical prior art catalyst was prepared and arbitrarily assigned an activity value of 100. The standard catalyst was prepared by adding solutions of cobalt nitrate and ammonium heptamolybdate to a slurry of spray-dried precipitated alumina in a mix-muller and then mixing, extruding, drying and calcining to form catalyst particles having a content of 6% CoO and 12% $MoO_3$, by weight, based on weight of the calcined catalyst. The catalyst material thus obtained is widely used commercially and represents a catalyst of desirable activity. Instead of ranking the catalysts simply as to sulfur content of the product heating oil, it is more meaningful to express catalyst activity relative to the arbitrarily designated standard. This is the procedure employed in the examples which follow wherein $K_rSR$ and $K_wSR$ are the relative volume and weight sulfur removal activities at the temperatures indicated. Similarly, $K_rBNR$ and $K_wBNR$ are the relative basic nitrogen removal activities.

EXAMPLE 1

In 125 ccs. of water were dissolved 53.7 grams of $(NH_4)_2Mo_2O_7$ (ammonium dimolybdate). There were then added 26.5 grams of 86.3%, $H_3PO_4$, followed by 36.5 grams of urea. A clear solution resulted in about 10 minutes and 88.5 grams of $Co(NO_3)_2.6H_2O$ were added. After 30 minutes of agitation a clear red solution was obtained. The solution contains 2 moles urea per mole of cobalt.

Calcined alumina extrudates formed into cylinders of 1/16 inch diameter from precipitated alumina and having a pore volume of 0.74 cc. per gram were employed as carrier. The solution prepared above was diluted to 220 cc. and sprayed onto 300 grams of carrier. Spraying was effected on the extrudates revolving in a gallon jar using a pressurized spray gun. Spraying was for about 5 minutes and the extrudates were rotated for an additional hour. The wet extrudates were allowed to stand overnight and then dried at 480°F. for two hours. The dried pills were then calcined at 1,200°F. for 1.5 hours. The extrudates were uniformly of deep royal blue coloration and had the composition 6% CoO, 12% $MoO_3$, 3.2% P, and balance alumina. No evolution of oxides of nitrogen occurred during calcination of the impregnated support.

Performance of the catalyst prepared above was tested under standard procedures for sulfur removal and basic nitrogen removal compared to the standard catalyst described above. The feed stock tested had the following properties:
1.4% sulfur
35 ppm basic nitrogen
30.8 API gravity
240°F. low boiling point
726°F. high boiling point Comparative activities based on an activity of 100 assigned to the standard were as follows:

| | | Sulfur removal | |
|---|---|---|---|
| $K_rSR$ | | Volume activity | 650°F. = 201 |
| | | | 725°F. = 285 |
| $K_wSR$ | | Weight activity | 650°F. = 159 |
| | | Basic Nitrogen Removal | |
| $K_rBNR$ | | Volume activity | 725°F. = 392 |
| $K_wBNR$ | | Weight activity | 725°F. = 310 |

COMPARATIVE EXAMPLE A

To 50 cc. of hot water (ca. 150°F.) were added 26.6 grams of $(NH_4)_2 M_2O_7$. In twenty minutes complete solution was not achieved. There were then added 4.8 cc. of 86.32% $H_3PO_4$ and complete solution was effected.

To the solution were then added 15.9 grams of Co(NO$_3$)$_2$·6H$_2$O to give initially a clear red solution. However, within four hours a precipitate started to appear and after 6 hours a relatively large volume of precipitate was present.

EXAMPLE 2

The procedure of comparative Example A was repeated in every detail except that prior to the addition of cobalt nitrate there were added 6.6 grams of urea. A clear solution resulted with no precipitation noted on standing for at least 24 hours. This example taken with Comparative Example A shows the benefits of urea in stabilizing the promoter solution.

COMPARATIVE EXAMPLE B

A sample of the support used in Example 1, 100 grams, was impregnated with 74 ccs. of a solution of 15.9 grams of Co(NO$_3$)$_2$·6H$_2$O in water to provide impregnated extrudates of red color. The extrudates were heated in a crucible over a Meeker burner for 30 minutes, during which time copious fumes of reddish-brown color, typical of oxides of nitrogen, were observed.

EXAMPLE 3

The procedure of Comparative Example B was repeated in all details except that the impregnating solution contained in addition to the cobalt nitrate, 6.6 grams of urea. Heating during the thirty minute interval produced only white fumes typical of a content of nitrogen, carbon dioxide, and water. This example taken with Comparative Example B shows the ability of urea to suppress formation of oxides of nitrogen during activation of an impregnated support.

COMPARATIVE EXAMPLE C

Following the procedure of Example 1 in every material detail except that urea was omitted in preparing the promoter solution, a catalyst sample was produced. During calcination of the impregnated support heavy fumes of oxides of nitrogen were produced. Relative activities of the catalyst obtained were as follows:

| | Sulfur Removal | |
|---|---|---|
| $K_rSR$ | Volume activity | 725°F. = 93 |
| $K_wSR$ | Weight activity | 725°F. = 69 |

Comparing these activities with the appropriate values of the catalyst of Example 1 indicates the desirable effects of urea usage in accordance with the invention on catalyst activity as well as its suppression of oxides of nitrogen during calcination of the impregnated support.

EXAMPLE 4

In this example, the preparation of treated carrier followed the procedure given in Example 1 in every material detail. After the extrudates were sprayed with promoter solution they were allowed to stand for 2 hours. They were then dried for 4 hours at 220°F. Next, the dried extrudates were placed in a calciner at a temperature of 390°F. The temperature was raised to 660°F. over a 17 hour period. At the end of this time, the extrudates were calcined at 1200°F. for 1.5 hours. The product had the same color and composition as that of Example 1. Relative activities of the catalyst obtained were as follows:

| | Sulfur Removal | |
|---|---|---|
| $K_rSR$ | Volume Activity | 650°F. = 240 |
| | | 725°F. = 7200 |
| $K_wSR$ | Weight Activity | 650°F. = 185 |
| | | 725°F. = 5550 |

EXAMPLE 5

To 930 cc. of deionized water were added 488 grams of (NH$_4$)$_2$Mo$_2$O$_7$ and 240 cc. of 86.1% H$_3$PO$_4$ to obtain a clear solution. To the resulting solution were added 330 grams of urea, followed by 810 grams of Co(NO$_3$)$_2$·6H$_2$O and volume adjustment with water to 1980 ccs.

The carrier of Example 1 was employed in the amount of 6 pounds, the carrier having been freshly calcined in a rotary kiln at 1100°F. for 1 hour. On the carrier in the rotary kiln at ambient temperature, the solution prepared above was sprayed over a period of about 6 minutes while tumbling the carrier. After spraying, the wet carrier was tumbled for an additional 20 minutes and then held at ambient temperature overnight.

The treated carrier was then dried at 250°F. for 18 hours and then subjected to a stepwise drying at increasing temperature according to the following schedule:

Heat from 250°F. to 350°F. and hold 1 hour.
Heat to 375°F. and hold 1.5 hours.
Heat to 400°F. and hold 1 hour.
Heat to 450°F. and hold 1 hour.
Heat to 500°F. and hold 1 hour.

The treated carrier was then allowed to cool to ambient temperature overnight and then calcined at 1200°F. for 1 hour.

The catalyst obtained was of royal blue coloration and had a composition of 6.0% CoO, 12% MoO$_3$, 3.2% P, and the balance alumina. Physical properties were as follows:

Pore volume = 0.495 cc. per gram
Apparent Bulk Density = 0.74 gram per cc.
Compact Bulk Density = 0.78 gram per cc.
Average Particle Diameter = 0.057 inch.
Average Particle Length 0.197 inch.
Average Crush Strength per 1/8 inch length = 12.5 lb.

Relative activity values were as follows:

| | Sulfur Removal | |
|---|---|---|
| $K_rSR$ | Volume activity | 700°F. = 222 |
| $K_wSR$ | Weight activity | 700°F. = 156 |

EXAMPLE 6

Following the procedure of Example 1, two catalyst preparations were made employing in separate runs 0.5 and 2.0 moles of urea per mole of cobalt in the promoter solution. Activity and suppression of oxides of nitrogen are as follows:

Sulfur Removal

| $K_rSR$ | Volume Activity at 650°F. |
|---|---|
| 0.5 | Mole urea = 132 |

-Continued

Sulfur Removal $\frac{2.0}{\text{Moles urea}} = 165$

Suppression of Oxides of Nitrogen

| | Red-Brown Fumes Evolved |
|---|---|
| 0.5 mole urea | = Heavy |
| 2.0 mole urea | = very light |

COMPARATIVE EXAMPLE D

The procedure of Example 1 was followed except that in place of the cobalt nitrate there was employed an equal amount of nickel nitrate, $Ni(NO_3)_2 \cdot 6H_2O$.

COMPARATIVE EXAMPLE E

The procedure of Example 1 was followed except that the urea was omitted an in place of the cobalt nitrate there was employed an equal amount of nickel nitrate.

A comparision of the activities of the catalysts obtained in Comparative Examples D and E indicated that the nickel-containing catalyst containing urea (D) was lower in sulfur removal activity and basic nitrogen removal than the nickel-containing catalyst not containing urea (E). The catalyst of comparative Example E was essentially equal to the standard in activity.

EXAMPLE 7

The promoter solution prepared for use in treating the support in accordance with Example 1 is again prepared. The solution is heated to removal about half of its liquor volume. The solution is then allowed to cool. Upon cooling, it is noted that urea crystals have formed but no precipitation of promoter materials is noted.

COMPARATIVE EXAMPLE F

The procedure of Example 7 is attempted except that the solution prepared in conjunction with Comparative Example C is again prepared. When only about 5 percent of the liquor volume is removed by heating, precipitation of promoter materials is noted.

EXAMPLE 8

In 100 cc. of deionized water were dissolved 41.2 grams of citric acid. To the acid solution were added 53.7 grams of $(NH_4)_2 Mo_2O_7$ and the mixture was heated to effect solution with stirring. There were then added 24.3 grams of urea which dissolved, followed by 59.2 grams of $Co(NO_3)_2 \cdot 6H_2O$ to give a red solution free of any insolubles. The solution was diluted to 210 cc with deionized water and exhibited a pH of 1.30.

Freshly calcined 1/16 inch precipitated alumina extrudates to be promoted had the following properties:

Pore volume = 0.74 cc/gram
Compacted Bulk Density = 0.56 gram/cc

On 200 grams of the extrudates were sprayed 140 cc of the solution prepared above. After spraying, the extrudate particles were allowed to tumble for two hours. After tumbling, the extrudates were dried for four hours at 250°F.

The catalyst was then activated according to the schedule which follows.

Heated at 221°F. for 0.5 hour.
Heated to 350°F. and held for 1.5 hours.
Heated to 375°F. and held for 1.5 hours.
Heated to 400°F. and held for 1.5 hours.
Heated to 482°F. and held for 1 hour.

The extrudates were then cooled and placed in a muffle furnace at ambient temperature. The furnace was then heated to 1200°F. and the samples were calcined at 1200°F. for 1.5 hours.

The activated extrudates were of royal blue coloration and contained 4% CoO and 12% $MoO_3$, with the balance being alumina.

When this composite was evaluated following the procedure of Example 1, substantially the same activity reported in Example 1 was obtained.

EXAMPLE 9

The procedure of Example 1 is repeated in every essential detail except that the treated extrudates are not dried prior to calcination. The catalyst composite obtained has substantially the same properties as that of Example 1.

EXAMPLE 10

In 80 cc. of deionized water were dissolved 45.1 grams of citric acid. To the acid solution were added 34.4 grams of $(NH_4)_2Mo_2O_7$. The mixture was gently heated with stirring to effect complete soltion. There were then added 23.5 grams of urea which readily dissolved. Next, there were added 48.7 grams of $Co(C_2H_3O_2)_2 \cdot 4H_2O$. The mixture was heated to 150°F. with stirring to provide a red solution free of any insolubles. There was obtained 140 cc of a solution having a pH of 3.68.

The solution was sprayed onto 200 grams of freshly calcined extrudates as described in Example 8. The extrudates were dried and activated as described in Example 8. The extrudates were of royal blue coloration and had a content of 6% CoO, 12% $MoO_3$ and the balance alumina. The relative sulfur removal activity $K_rSR$, was 131 compared to that of Comparative Example G.

COMPARATIVE EXAMPLE G

The procedure of Example 10 was repeated in every material detail except that urea was omitted in preparing the promoter solution, which had a pH of 3.4.

The composite exhibited a $K_rSR$ of 100 compared to the composite of Example 10.

EXAMPLE 11

To 800 ccs. of water were added 162.8 grams of urea and upon solution, the volume was adjusted to 1,000 ccs. Onto 1,200 grams of freshly calcined extrudates as described in Example 8 were sprayed 900 ccs. of the urea solution. After tumbling the extrudates were dried overnight at 212°F. and then for 2 hours at 248°F. The treated extrudates exhibited a pore volume of 0.65 cc/gm.

A solution containing 35.8 grams of $(NH_4)_2Mo_2O_7$, 17.7 ccs. of 86.32% phosphoric acid and 56.9 grams $Co(NO_3)_2$ in a total volume of 130 ccs with water was prepared and exhibited a pH of 0.58. The solution was sprayed onto 200 gms. of the urea-treated extrudates. After tumbling, the wet extrudates were dried and activated following the procedure of Example 8. The activated composite was of royal blue coloration and had the composition 6% CoO, 12% $MoO_3$, 3.2% P and the balance alumina.

Activity of the composite is substantially the same as the composite of Example 1.

I claim:

1. A process for preparing a hydrodesulfurization catalyst which comprises: preparing a calcined formed alumina support; treating said support so as to furnish thereon an aqueous solution of (a) a cobalt compound, (b) a molybdenum compound, and (c) urea in an amount at least 0.5 molar with respect to the molar quantity of cobalt furnished, said compounds upon subsequent activation providing the corresponding metal oxides, said furnish providing an aqueous solution stable with respect to precipitation; dehydrating the thus-treated support; and activating the dehydrated support so as to provide a composite containing from about 1 percent to 8 percent cobalt and from about 8 percent to 20 percent molybdenum, said percentages being by weight based on the weight of the activated composite and expressed as the metal oxides.

2. The process of claim 1 wherein the cobalt source and the molybdenum are furnished in a single aqueous solution.

3. The process of claim 1 wherein the cobalt source, molybdenum source, and urea are furnished in a single aqueous solution.

4. The process of claim 1 wherein said furnish also provides sufficient acid to stabilize said solution.

5. The process of claim 4 wherein said acid is phosphoric acid.

6. The process of claim 1 wherein said urea is furnished in an amount which is 2 molar with respect to the molar quantity of cobalt furnished.

7. The process of claim 1 wherein said cobalt source is cobalt nitrate.

8. The process of claim 1 wherein said molybdenum source is an ammonium molybdate.

9. The process of claim 8 wherein said ammonium molybdate is ammonium dimolybdate.

10. A hydrodesulfurization catalyst prepared by the process of claim 1.

* * * * *